(12) United States Patent
Fujiwara

(10) Patent No.: US 8,766,187 B2
(45) Date of Patent: Jul. 1, 2014

(54) PYROELECTRIC SENSOR ARRAY AND PYROELECTRIC INFRARED DETECTION DEVICE

(75) Inventor: Shigemi Fujiwara, Sendai (JP)

(73) Assignee: NEC TOKIN Corporation, Sendai-shi, Miyagi (JP)

( * ) Notice: Subject to any disclaimer, the term of this patent is extended or adjusted under 35 U.S.C. 154(b) by 0 days.

(21) Appl. No.: 13/881,354

(22) PCT Filed: Oct. 18, 2011

(86) PCT No.: PCT/JP2011/073932
§ 371 (c)(1),
(2), (4) Date: Apr. 24, 2013

(87) PCT Pub. No.: WO2012/056943
PCT Pub. Date: May 3, 2012

(65) Prior Publication Data
US 2013/0221220 A1    Aug. 29, 2013

(30) Foreign Application Priority Data
Oct. 25, 2010    (JP) ................................. 2010-238221

(51) Int. Cl.
*G01J 5/00*    (2006.01)
(52) U.S. Cl.
USPC ..................................................... 250/338.3
(58) Field of Classification Search
USPC .......................................... 250/338.1–338.5
See application file for complete search history.

(56) References Cited

U.S. PATENT DOCUMENTS

| | | | |
|---|---|---|---|
| 4,928,910 A * | 5/1990 | Utterback et al. | 246/169 A |
| 5,149,025 A * | 9/1992 | Utterback et al. | 246/169 A |
| 5,231,289 A * | 7/1993 | Kita et al. | 250/338.1 |
| 5,528,038 A | 6/1996 | Yoshiike et al. | |
| 5,625,188 A | 4/1997 | Hori | |
| 5,826,980 A * | 10/1998 | Kouzu et al. | 374/124 |
| 2009/0160424 A1* | 6/2009 | Yamamoto | 323/355 |

FOREIGN PATENT DOCUMENTS

| | | |
|---|---|---|
| JP | 04-198724 A | 7/1992 |
| JP | 05-003346 A | 1/1993 |
| JP | 06-186082 A | 7/1994 |
| JP | 07-128142 A | 5/1995 |
| JP | 7-034334 U | 6/1995 |
| JP | 07-198479 A | 8/1995 |
| JP | 2009-186374 A | 8/2009 |

OTHER PUBLICATIONS

International Search Report (ISR) dated Jan. 24, 2012, in parent International Application No. PCT/JP2011/073932.

* cited by examiner

*Primary Examiner* — Kiho Kim

(74) *Attorney, Agent, or Firm* — Holtz Holtz Goodman & Chick PC

(57) ABSTRACT

A pyroelectric sensor array is attachable on a circuit board. The pyroelectric sensor array comprises a pyroelectric board and a plurality of pyroelectric elements formed on the pyroelectric board. The pyroelectric board has a connection surface configured to be placed on the circuit board. The pyroelectric elements contains a peripheral pyroelectric element arranged at a peripheral portion of the pyroelectric board in a predetermined arranging direction and a central pyroelectric element arranged at a central portion of the pyroelectric board. Each of the pyroelectric elements has two adjacent connection electrodes formed on the connection surface. An electrostatic capacity between the two connection electrodes of the peripheral pyroelectric element is larger than an electrostatic capacity between the two connection electrodes of the central pyroelectric element.

15 Claims, 10 Drawing Sheets

PYROELECTRIC SENSOR ARRAY AND PYROELECTRIC INFRARED DETECTION DEVICE

TECHNICAL FIELD

This invention relates to a pyroelectric sensor array and a pyroelectric infrared detection device each configured to detect an infrared light applied to a pyroelectric member by an electric potential induced on a surface of the pyroelectrics.

BACKGROUND ART

This type of pyroelectric infrared detection device generally comprises a circuit board and a pyroelectric sensor array mounted on the circuit board. The pyroelectric sensor array consists of a pyroelectric board and a plurality of pyroelectric sensors (pyroelectric elements) formed on the pyroelectric board. As for thus configured pyroelectric infrared detection device, infrared detection sensitivities of the pyroelectric elements might vary according to an arrangement of the pyroelectric elements.

For example, according to Patent Document 1, as compared with a heat generated by an infrared light in an infrared sensor element (pyroelectric element) arranged in the vicinity of an end of a pyroelectric board, a heat generated in an infrared sensor element arranged in the vicinity of the center of a pyroelectric board is easily dissipated (i.e. a thermal resistance tends to be lowered). Accordingly, detection sensitivities of the infrared sensor elements may vary. According to Patent Document 1, the infrared sensor element and the circuit board are connected with each other by a solder bump. It is possible to adjust the variation of the thermal resistance by forming a size of a cross-section of the solder bump in the vicinity of the end of the pyroelectric board to be different from a size of the cross-section of the solder bump in the vicinity of the center of the pyroelectric board. It is therefore possible to reduce the variation of the detection sensitivity.

PRIOR ART DOCUMENTS

Patent Document(s)

Patent Document 1: JP-U H7-34334

SUMMARY OF INVENTION

Technical Problem

However, the pyroelectric infrared detection device disclosed in Patent Document 1 reduces the variation of the detection sensitivity by damaging a heat insulation between the pyroelectric board and the circuit board. More specifically, the heat generated in the pyroelectric board is mainly dissipated from the vicinity of the end to the circuit board so that the variation of the detection sensitivity is reduced. Accordingly, the detection sensitivity of the whole pyroelectric board may be lowered.

Moreover, the detection sensitivity of the pyroelectric element is largely affected by an electrostatic capacity in the pyroelectric board. In detail, the circuit board includes potential detection circuits formed on the outside of the pyroelectric board, and conductive patterns each connecting a connection electrode of the pyroelectric element and the potential detection circuit with each other. A length of the central conductive pattern which connects the pyroelectric element in the vicinity of the center of the pyroelectric board with the potential detection circuit is longer than a length of the conductive pattern which connects the end pyroelectric element in the vicinity of the end of the pyroelectric board with the potential detection circuit. Accordingly, an electrostatic capacity generated in the central conductive pattern is larger than an electrostatic capacity generated in the end conductive pattern. In other words, the electrostatic capacities different from each other are generated in the pyroelectric element in the vicinity of the end of the pyroelectric board and in the pyroelectric element in the vicinity of the center of the pyroelectric board, respectively. Accordingly, the detection sensitivities of the pyroelectric elements may vary.

Moreover, characteristics of response time for an electric potential of the connection electrode of the pyroelectric element to reach a steady state may vary by the aforementioned variation of the electrostatic capacity. Even when the aforementioned variation of the detection sensitivity is adjusted by a complicated operation such as setting an amplification factor of each of the potential detection circuits separately, the time response characteristics is unable to be adjusted.

It is therefore an object of the present invention to provide a pyroelectric sensor array and a pyroelectric infrared detection device each of which enables the variation of the detection sensitivity and the variation of the time response characteristics caused by an arrangement of the pyroelectric elements on the pyroelectric board to be reduced without damaging a heat insulation between the pyroelectric board and the circuit board.

Solution to Problem

One aspect of the present invention provides a pyroelectric sensor array attachable on a circuit board. The pyroelectric sensor array comprises a pyroelectric board and a plurality of pyroelectric elements formed on the pyroelectric board. The pyroelectric board has a connection surface configured to be placed on the circuit board. The pyroelectric elements contain a peripheral pyroelectric element arranged at a peripheral portion of the pyroelectric board in a predetermined arranging direction and a central pyroelectric element arranged at a central portion of the pyroelectric board. Each of the pyroelectric elements has two adjacent connection electrodes formed on the connection surface. An electrostatic capacity between the two connection electrodes of the peripheral pyroelectric element is larger than an electrostatic capacity between the two connection electrodes of the central pyroelectric element.

Another aspect of the present invention provides a pyroelectric infrared detection device comprising the pyroelectric sensor array and a circuit board attached with the pyroelectric sensor array. The circuit board includes a mount portion on which the connection surface of the pyroelectric sensor array is placed, a plurality of potential detection circuits provided on outside of the mount portion, a ground portion, a plurality of conductive patterns and a plurality of ground conductive patterns. The conductive pattern electrically connects one of the two connection electrodes and the potential detection circuit with each other while the ground conductive pattern electrically connects a remaining one of the two connection electrodes and the ground portion with each other.

Advantageous Effects of Invention

According to the present invention, an electrostatic capacity between two connection electrodes of a pyroelectric element arranged at a peripheral portion of a pyroelectric board is larger than an electrostatic capacity between two connection electrodes of a pyroelectric element arranged at a central portion of the pyroelectric board. Accordingly, it is possible to reduce a variation of detection sensitivity and a variation of time response characteristics of the pyroelectric elements without damaging a heat insulation between the pyroelectric board and a circuit board.

An appreciation of the objectives of the present invention and a more complete understanding of its structure may be had by studying the following description of the preferred embodiment and by referring to the accompanying drawings.

BRIEF DESCRIPTION OF DRAWINGS

FIG. 12(a) shows a connection electrode group arranged at a central portion (a part shown by dashed line A of FIG. 11). FIG. 12(b) shows a connection electrode group arranged at a peripheral portion (a part shown by dashed line B of FIG. 11).

DESCRIPTION OF EMBODIMENTS

Figure 1:
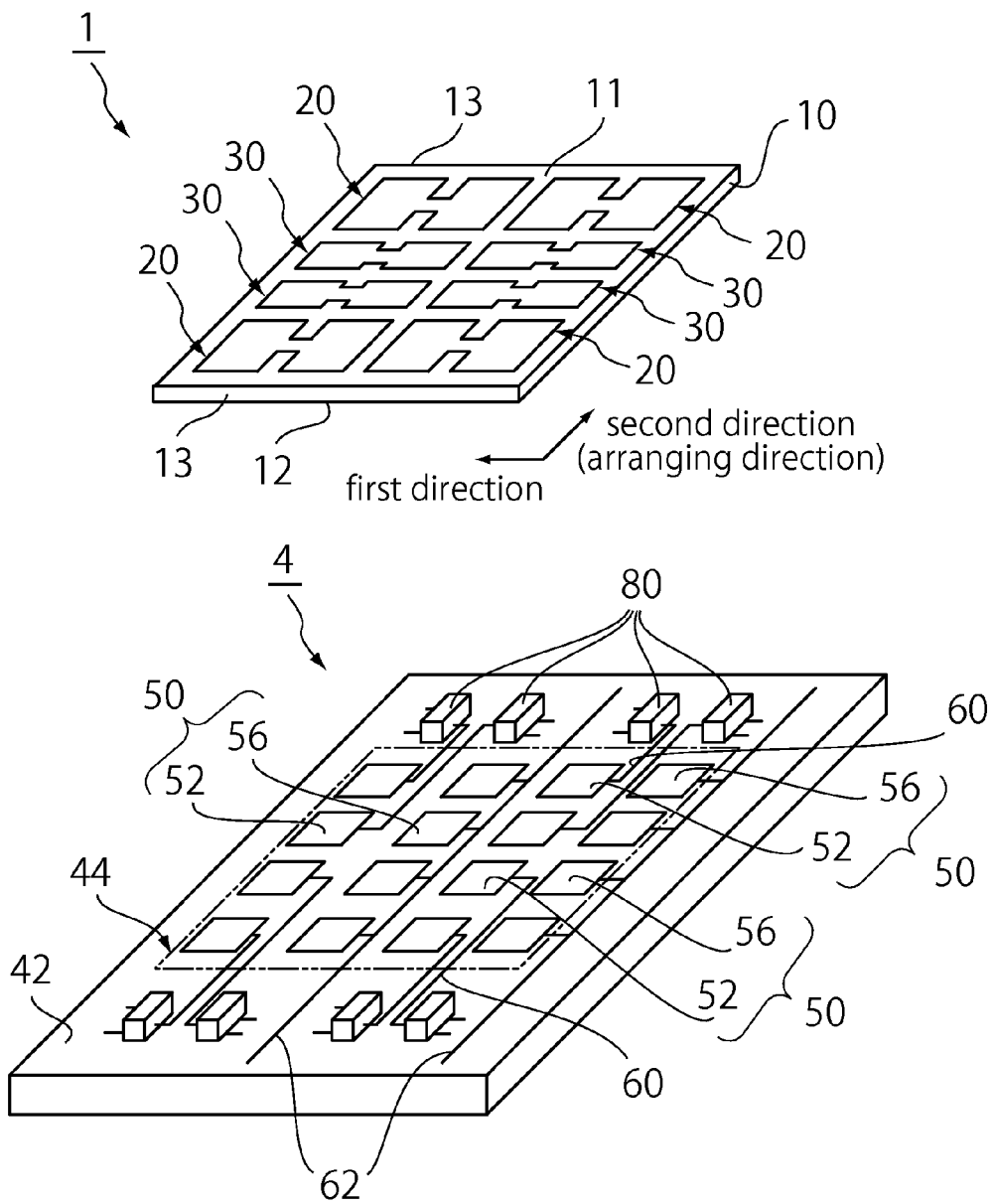
FIG. 1 is an exploded, perspective view showing a pyroelectric infrared detection device according to a first embodiment of the present invention, wherein a mount portion of a circuit board, where a pyroelectric sensor array is mounted, is illustrated by two-dot chain line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

[First Embodiment]

As shown in FIG. 1, a pyroelectric infrared detection device according to a first embodiment of the present invention comprises a pyroelectric sensor array 1 and a circuit board 4 attached with the pyroelectric sensor array 1. In other words, the pyroelectric sensor array 1 is configured to be attachable on the circuit board 4.

Figure 2:
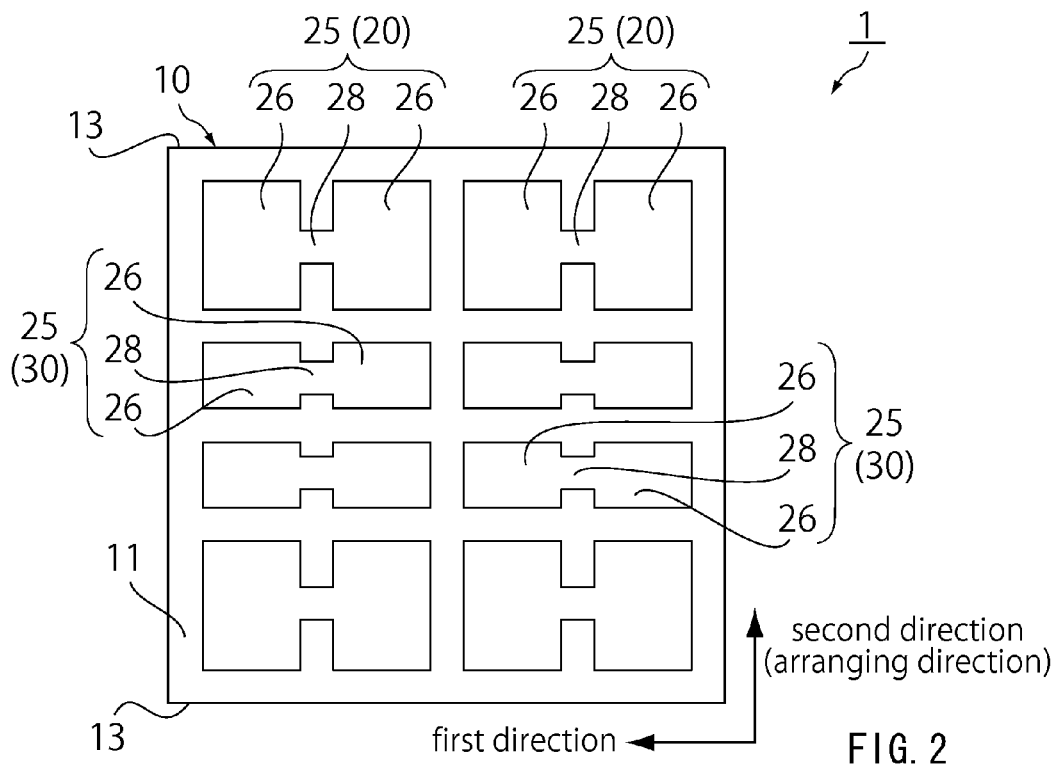
FIG. 2 is a plan view showing a light receiving surface of the pyroelectric sensor array of FIG. 1.
Figure 3:
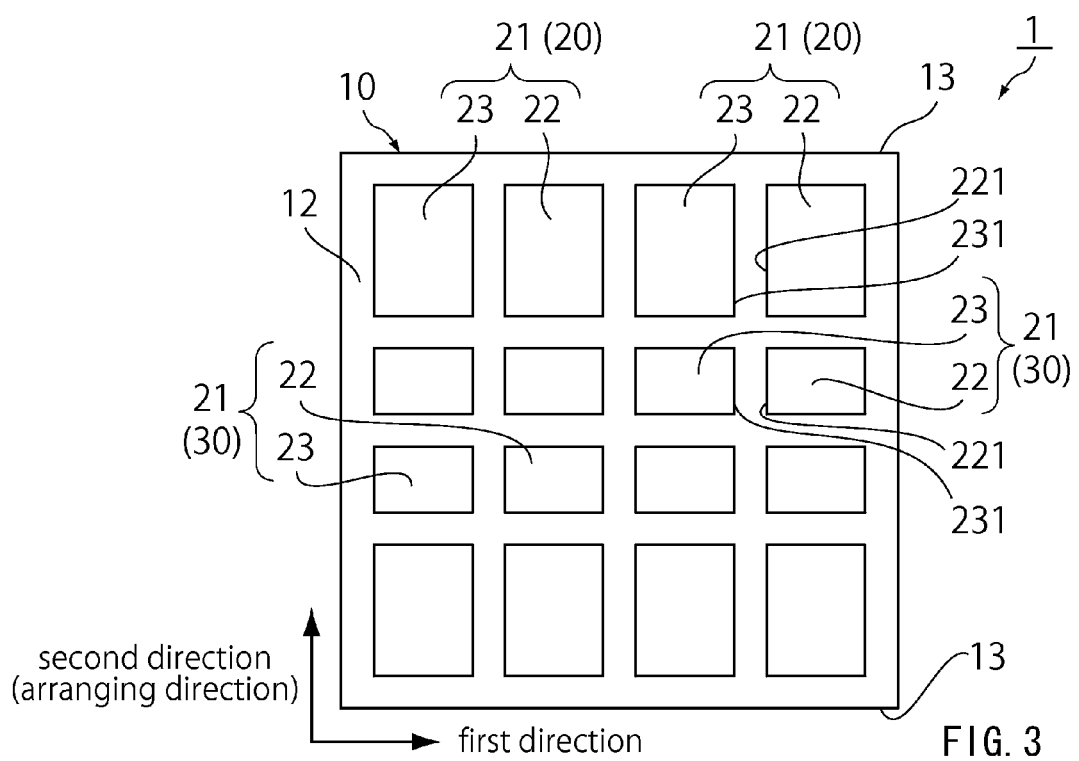
FIG. 3 is a plan view showing a connection surface of the pyroelectric sensor array of FIG. 1.

As shown in FIGS. 1 to 3, the pyroelectric sensor array 1 comprises a pyroelectric board 10 made of a pyroelectrics, a plurality of peripheral pyroelectric elements (pyroelectric elements) 20 formed on the pyroelectric board 10, and a plurality of central pyroelectric elements (pyroelectric elements) 30 formed on the pyroelectric board 10.

The pyroelectric board 10 according to the present embodiment is shaped in a plate-like shape which extends in two directions (a first direction and a second direction) perpendicular to each other. In detail, the pyroelectric board 10 has a rectangular light receiving surface 11 configured to receive an infrared light and a rectangular connection surface 12 configured to be placed on the circuit board 4. The light receiving surface 11 and the connection surface 12 extend in parallel to each other along the first direction and the second direction. The pyroelectric board 10 according to the present embodiment has end portions 13 at opposite ends thereof in an up-down direction (the second direction) of each of FIGS. 2 and 3.

As shown in FIG. 1, according to the present embodiment, the pyroelectric elements 20 are arranged in the vicinities of the end portions 13 in the second direction (arrangement direction) while the pyroelectric elements 30 are arranged at the middle portion in the arrangement direction. In other words, the pyroelectric elements 20 are arranged at a peripheral portion of the pyroelectric board 10 in the predetermined arrangement direction (the second direction) while the pyroelectric elements 30 are arranged at a central portion of the pyroelectric board 10. According to the present embodiment, the two pyroelectric elements 20 are formed in the vicinity of each of the end portions 13 and the four pyroelectric elements 30 are formed at the middle portion between the two end portions 13.

As shown in FIGS. 1 to 3, each of the pyroelectric elements 20 and the pyroelectric elements 30 consists of a light receiving electrode group 25 formed on the light receiving surface 11 of the pyroelectric board 10, a connection electrode group 21 formed on the connection surface 12, and a part of the pyroelectric board 10 which is sandwiched by the light receiving electrode group 25 and the connection electrode group 21 so that each of the pyroelectric elements 20 and the pyroelectric elements 30 functions as a pyroelectric sensor.

As shown in FIG. 2, the light receiving electrode group 25 according to the present embodiment has two rectangular light receiving electrodes 26 and a connecting pattern 28 which is made of a conductive material and connects the two light receiving electrodes 26 with each other. In other words, the two light receiving electrodes 26 of the light receiving electrode group 25 are electrically connected by the connecting pattern 28.

As shown in FIG. 3, the connection electrode group 21 includes a rectangular first connection electrode (connection electrode) 22 and a rectangular second connection electrode (connection electrode) 23. According to the present embodiment, the connection electrode 22 and the connection electrode 23 face each other in the first direction (a right-to-left direction of FIG. 3) in parallel to the connection surface 12. In detail, the connection electrode 22 and the connection electrode 23 have a facing side 221 and a facing side 231, respectively. The facing side 221 and the facing side 231 extend along the second direction. The facing side 221 and the facing side 231 face each other in the first direction. In other words, each of the pyroelectric elements 20 and the pyroelectric elements 30 includes the adjacent connection electrodes 22 and 23 (i.e. the two adjacent connection electrodes) formed on the connection surface 12.

As can be seen from FIGS. 1 to 3, the connection electrode 22 and the light receiving electrode 26 are formed so as to be opposite to each other across the pyroelectric board 10. Similarly, the connection electrode 23 and the light receiving electrode 26 are formed so as to be opposite to each other across the pyroelectric board 10. As can be seen from the aforementioned description, each of the pyroelectric elements 20 and 30 according to the present embodiment functions as a so-called dual pyroelectric sensor. Accordingly, when an infrared light is applied to one of the light receiving electrodes 26, an electrical potential is generated between the connection electrode 22 and the connection electrode 23. In the meantime, the facing side 221 and the facing side 231 function as a capacitor between the connection electrode 22 and the connection electrode 23. In other words, the facing sides 221 and 231 are parts which generate an electrostatic capacity between the connection electrodes 22 and 23 (i.e. the two connection electrodes).

As shown in FIG. 3, an area of each of the connection electrodes 22 and 23 (i.e. the peripheral connection electrodes) of the pyroelectric element 20 is larger than an area of each of the connection electrodes 22 and 23 (i.e. the central connection electrodes) of the pyroelectric element 30. More specifically, according to the present embodiment, a length of the facing side 221 (or the facing side 231) of the pyroelectric element 20 is longer than a length of the facing side 221 (or the facing side 231) of the pyroelectric element 30. In other words, in the second direction which is perpendicular to the first direction and in parallel to the connection surface 12, a length of each of the connection electrodes 22 and 23 of the pyroelectric element 20 is longer than a length of each of the connection electrodes 22 and 23 of the pyroelectric element 30. Accordingly, an electrostatic capacity between the connection electrode 22 and the connection electrode 23 of the pyroelectric element 20 is larger than an electrostatic capacity between the connection electrode 22 and the connection electrode 23 of the pyroelectric element 30.

As shown in FIG. 1, the circuit board 4 comprises a board connection surface 42 which faces the connection surface 12 of the pyroelectric sensor array 1. The board connection surface 42 is provided with a mount portion 44 on which the connection surface 12 of the pyroelectric sensor array 1 is placed. The circuit board 4 further includes a plurality of potential detection circuits 80, a ground portion (not shown), a plurality of first circuit electrodes (circuit electrodes) 52, a plurality of second circuit electrodes (circuit electrodes) 56, a plurality of conductive patterns 60 and a plurality of ground conductive patterns 62.

The potential detection circuit 80 is a circuit for detecting an electric potential generated in each of the pyroelectric elements 20 and 30. The potential detection circuit 80 is provided on the outside of the mount portion 44. When the pyroelectric sensor array 1 is installed to the potential detection circuits 80, the potential detection circuits 80 are located at the outside of the pyroelectric sensor array 1. According to the present embodiment, the four potential detection circuits 80 are arranged in the vicinity of each of the two end portions 13 of the pyroelectric sensor array 1.

As can be seen from FIGS. 1 to 3, the circuit electrodes 52 and 56 are formed at positions which correspond to the connection electrodes 22 and 23 of the connection surface 12, respectively. More specifically, according to the present embodiment, eight circuit electrode groups (combination electrodes) 50, each of which is composed of the circuit electrode 52 and the circuit electrode 56, are formed. Each of the combination electrodes 50 corresponds to the pyroelectric element 20 or the pyroelectric element 30. When the connection surface 12 is placed on the mount portion 44, the connection electrode 22 is located on the corresponding circuit electrode 52 while the connection electrode 23 is located on the corresponding circuit electrode 56.

As can be seen from FIG. 1, the conductive pattern 60 electrically connects the circuit electrode 52 and the potential detection circuit 80 with each other while the ground conductive pattern 62 electrically connects the circuit electrode 56 and the ground portion (not shown) with each other. The conductive pattern 60, which is connected to the circuit electrode 52 located at the central portion of the circuit board 4 (i.e. the circuit electrode 52 corresponding to the pyroelectric element 30), extends longer than the conductive pattern 60, which is connected to the circuit electrode 52 located in the vicinity of the potential detection circuit 80 of the circuit board 4 (i.e. the circuit electrode 52 corresponding to the pyroelectric element 20).

When the pyroelectric sensor array 1 configured as described above is attached to the circuit board 4, an adhesive (for example, a soldering paste or a conductive adhesive mainly containing conductive powders and a binder) is applied on the circuit electrodes 52 and 56. Then, the connection surface 12 is placed over the mount portion 44 so as to extend in parallel to the mount portion 44 while being apart from the mount portion 44 by a predetermined distance. In detail, the connection electrodes 22 and 23 are positioned and temporally fixed so as to be located right above the corresponding circuit electrodes 52 and 56. Then, the connection electrodes 22 and 23 are electrically connected and fixed to the corresponding circuit electrodes 52 and 56. For example, in a case where the soldering paste is used as the adhesive, it is possible to connect and fix by solder reflow process. In a case where the conductive adhesive is used as the adhesive, it is possible to connect and fix, for example, by hardening process. The pyroelectric sensor array 1 and the circuit board 4 are electrically connected by such operations as described above.

As can be seen from FIGS. 1 and 3, under a connected state where the pyroelectric sensor array 1 and the circuit board 4 are electrically connected, the conductive pattern 60 electrically connects the connection electrode 22 (i.e. one of the connection electrodes 22 and 23) and the potential detection circuit 80 with each other while the ground conductive pattern 62 electrically connects the connection electrode 23 (i.e. the other one of the connection electrodes 22 and 23) and the ground portion (not shown) with each other. Accordingly, when an infrared light is applied to the light receiving electrode 26 of the pyroelectric element 20 (or the pyroelectric element 30), the conductive pattern 60 and the ground conductive pattern 62 function as a capacitor so that a first electrostatic capacity caused by the conductive pattern 60 and the ground conductive pattern 62 is generated between the circuit electrode 52 and the circuit electrode 56. In other words, the combination electrode 50 composed of the circuit electrode 52 and the circuit electrode 56 has the first electrostatic capacity under the connected state.

A length of the conductive pattern 60 which electrically connects the connection electrode 22 of the pyroelectric element 20 and the potential detection circuit 80 with each other is shorter than a length of the conductive pattern 60 which electrically connects the connection electrode 22 of the pyroelectric element 30 and the potential detection circuit 80 with each other. Accordingly, the first electrostatic capacity of the combination electrode 50 corresponding to the pyroelectric element 20 is smaller than the first electrostatic capacity of the combination electrode 50 corresponding to the pyroelectric element 30. Thus, the first electrostatic capacities vary.

As described above, an electrostatic capacity is also generated between the connection electrode 22 and the connection electrode 23. Accordingly, under the connected state, a second electrostatic capacity caused by the connection electrode 22 and the connection electrode 23 is generated between the circuit electrode 52 and the circuit electrode 56.

As can be seen from the aforementioned description, under the connected state, the combination electrode 50 has a total electrostatic capacity of both the first electrostatic capacity and the second electrostatic capacity. It is possible to cancel the variation of the first electrostatic capacity by adjusting the second electrostatic capacity. More specifically, according to the present embodiment, it is possible to reduce or cancel the variation of the total electrostatic capacity of the combination electrodes 50 by shortening the lengths of the facing sides 221 and 231 of the pyroelectric element 30 (i.e. by reducing areas of the connection electrodes 22 and 23). Accordingly, it is possible to reduce the variation of the infrared detection sensitivity (detection sensitivity) and the variation of the time response characteristics of the pyroelectric elements 20 and 30.

Moreover, when the variation of the detection sensitivity due to different heat resistances of the pyroelectric elements 20 and 30 is so large that it cannot be ignored, it is possible to level the detection sensitivity by intentionally varying the total electrostatic capacity. More specifically, under the connected state, the total electrostatic capacity of the combination electrode 50 corresponding to the pyroelectric element 20 may be adjusted to be larger than the total electrostatic capacity of the combination electrode 50 corresponding to the pyroelectric element 30. However, it is necessary to consider an influence to the time response characteristics when adjusting as described above.

Moreover, it is possible to improve the heat insulation between the pyroelectric sensor array 1 and the circuit board 4 by connecting the connection electrodes 22 and 23 to the circuit electrodes 52 and 56 by the conductive adhesive. Accordingly, the detection sensitivity may be further improved.

[Second Embodiment]

Figure 4:
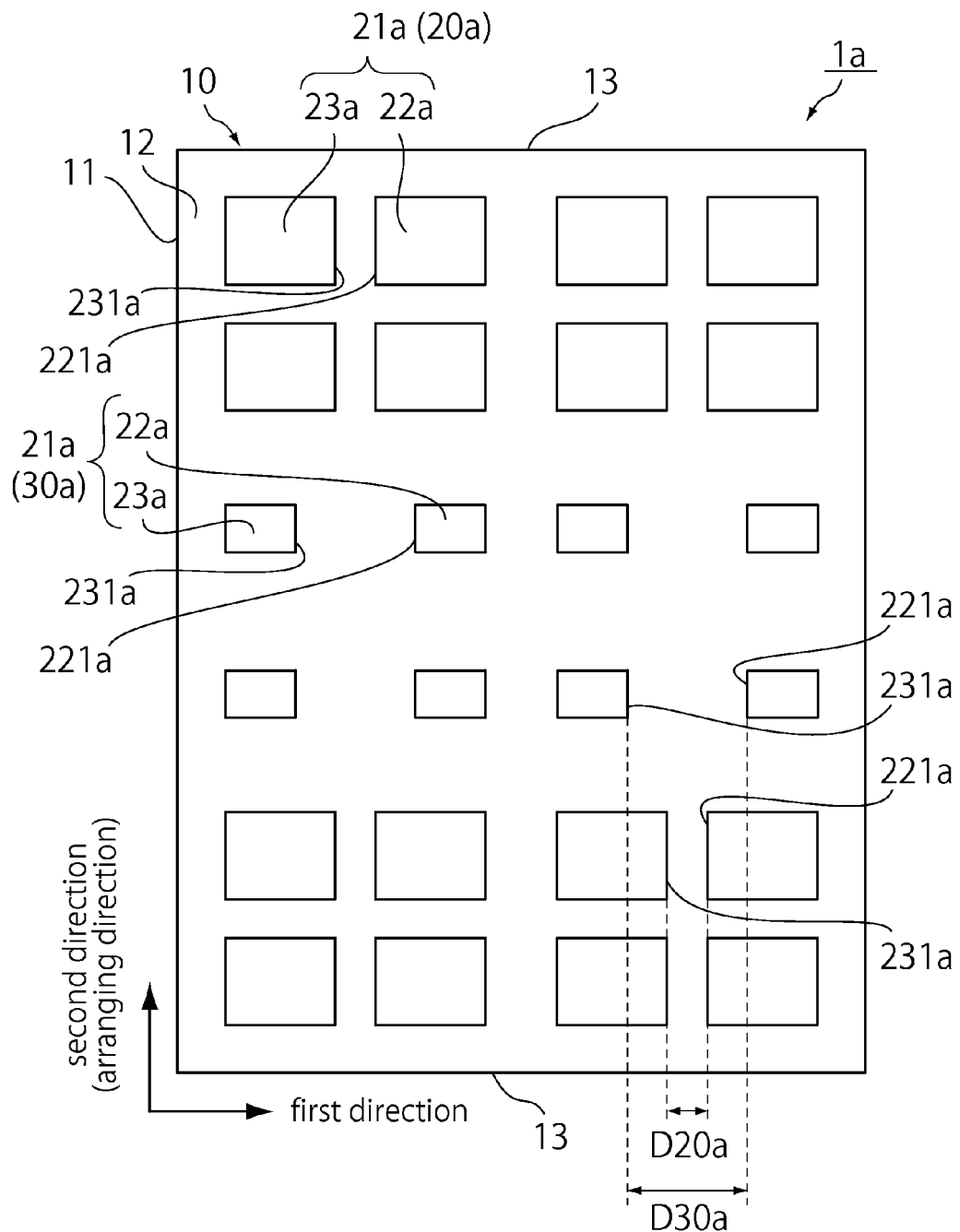
FIG. 4 is a plan view showing a connection surface of a pyroelectric sensor array according to a second embodiment of the present invention.

As can be seen from FIG. 4, a pyroelectric infrared detection device according to a second embodiment of the present invention comprises a circuit board (not shown) and a pyroelectric sensor array 1a, wherein the circuit board is configured similar to the circuit board 4 according to the first embodiment, and the pyroelectric sensor array 1a is configured to be mounted on the circuit board.

The pyroelectric sensor array 1a according to the present embodiment is shaped in a plate-like shape similar to the pyroelectric sensor array 1. In detail, the pyroelectric sensor array 1a comprises the pyroelectric board 10 configured similar to the first embodiment.

The pyroelectric board 10 is formed with eight peripheral pyroelectric elements (pyroelectric elements) 20a and four central pyroelectric elements (pyroelectric elements) 30a. The pyroelectric elements 20a and 30a are arranged along a predetermined arrangement direction (a second direction). In detail, the pyroelectric elements 20a are arranged in the vicinities of the end portions 13 of the pyroelectric board 10 (i.e. the peripheral portion of the pyroelectric board 10). The pyroelectric elements 30a are arranged between the pyroelectric elements 20a in the arrangement direction (i.e. arranged at the central portion of the pyroelectric board 10).

Similar to the pyroelectric elements 20 and 30 according to the first embodiment, each of the pyroelectric elements 20a and 30a is formed to sandwich a part of the pyroelectric board 10 by a light receiving electrode group (not shown) formed on the light receiving surface 11 and a connection electrode group 21a formed on the connection surface 12.

The connection electrode group 21a includes a first connection electrode (connection electrode) 22a and a second connection electrode (connection electrode) 23a which face each other in a first direction. In detail, the connection electrode 22a and the connection electrode 23a have a facing side 221a and a facing side 231a, respectively. The facing side 221a and the facing side 231a extend in parallel to each other along the second direction. The connection electrode 22a is a part which is electrically connected with a potential detection circuit (not shown) formed on a circuit board (not shown) under a connected state where the pyroelectric sensor array 1a and the circuit board are connected to each other. The connection electrode 23a is a part which is electrically connected to a ground portion (not shown) formed on the circuit board under the connected state. As can be seen from the aforementioned description, under the connected state, an electrostatic capacity is generated between the facing side 221a and the facing side 231a.

According to the present embodiment, similar to the first embodiment, the facing side 221a (the facing side 231a) of the pyroelectric elements 20 is longer than the facing side 221a (the facing side 231a) of the pyroelectric element 30. Moreover, a distance (D20a) between the facing side 221a and the facing side 231a of the pyroelectric elements 20 is shorter than a distance (D30a) between the facing side 221a and the facing side 231a of the pyroelectric element 30. In other words, a distance (space) in the first direction between the connection electrode 22a and the connection electrode 23a in the vicinity of the peripheral portion of the pyroelectric board 10 is shorter than a distance (space) in the first direction between the connection electrode 22a and the connection electrode 23a at the central portion of the pyroelectric board 10. The electrostatic capacity becomes larger as the space between the connection electrodes 22a and 23a becomes smaller. Accordingly, the electrostatic capacity generated in the pyroelectric element 20a arranged in the vicinity of the peripheral portion of the pyroelectric board 10 is larger than the electrostatic capacity generated in the pyroelectric element 30a arranged at the central portion of the pyroelectric board 10. As can be seen from the aforementioned description, similar to the first embodiment, it is possible to reduce or cancel the variation of the total electrostatic capacity by adjusting a distance between parts (the facing sides 221a and 231a) which generate the electrostatic capacity between the connection electrodes 22a and 23a of each of the pyroelectric elements 20a and 30a.

[Third Embodiment]

Figure 5:
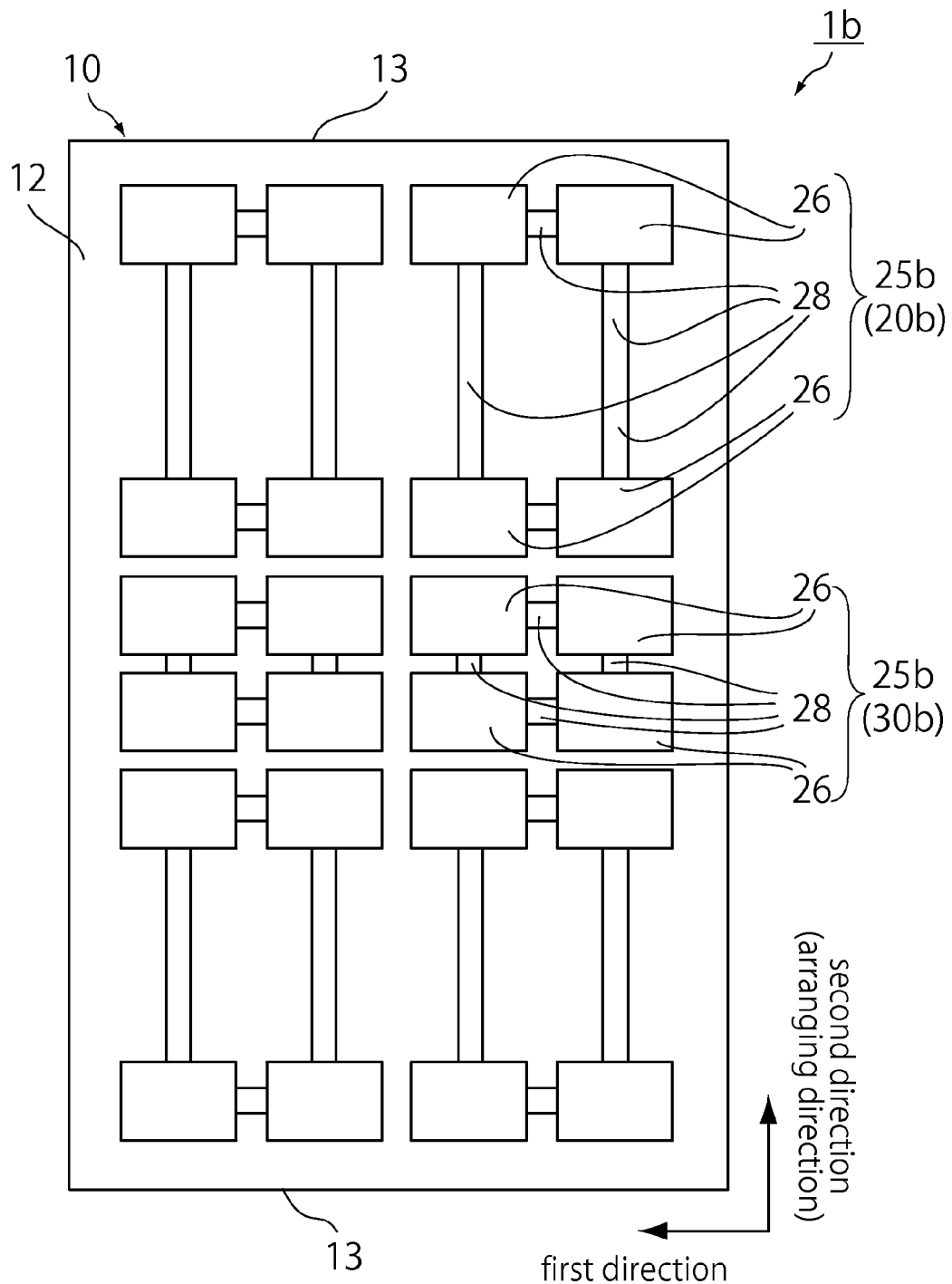
FIG. 5 is a plan view showing a light receiving surface of a pyroelectric sensor array according to a third embodiment of the present invention.
Figure 6:
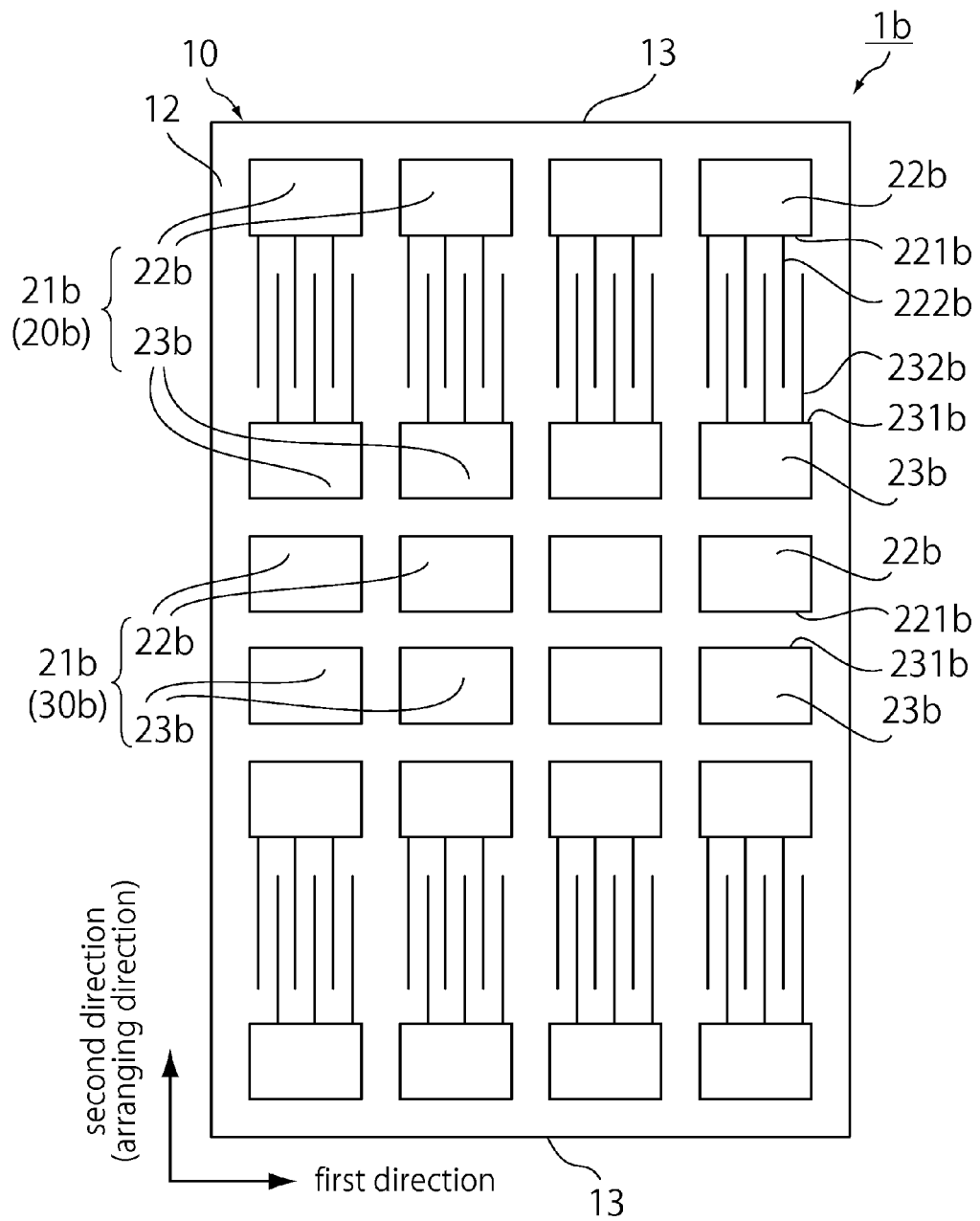
FIG. 6 is a plan view showing a connection surface of the pyroelectric sensor array of FIG. 5.
Figure 7:
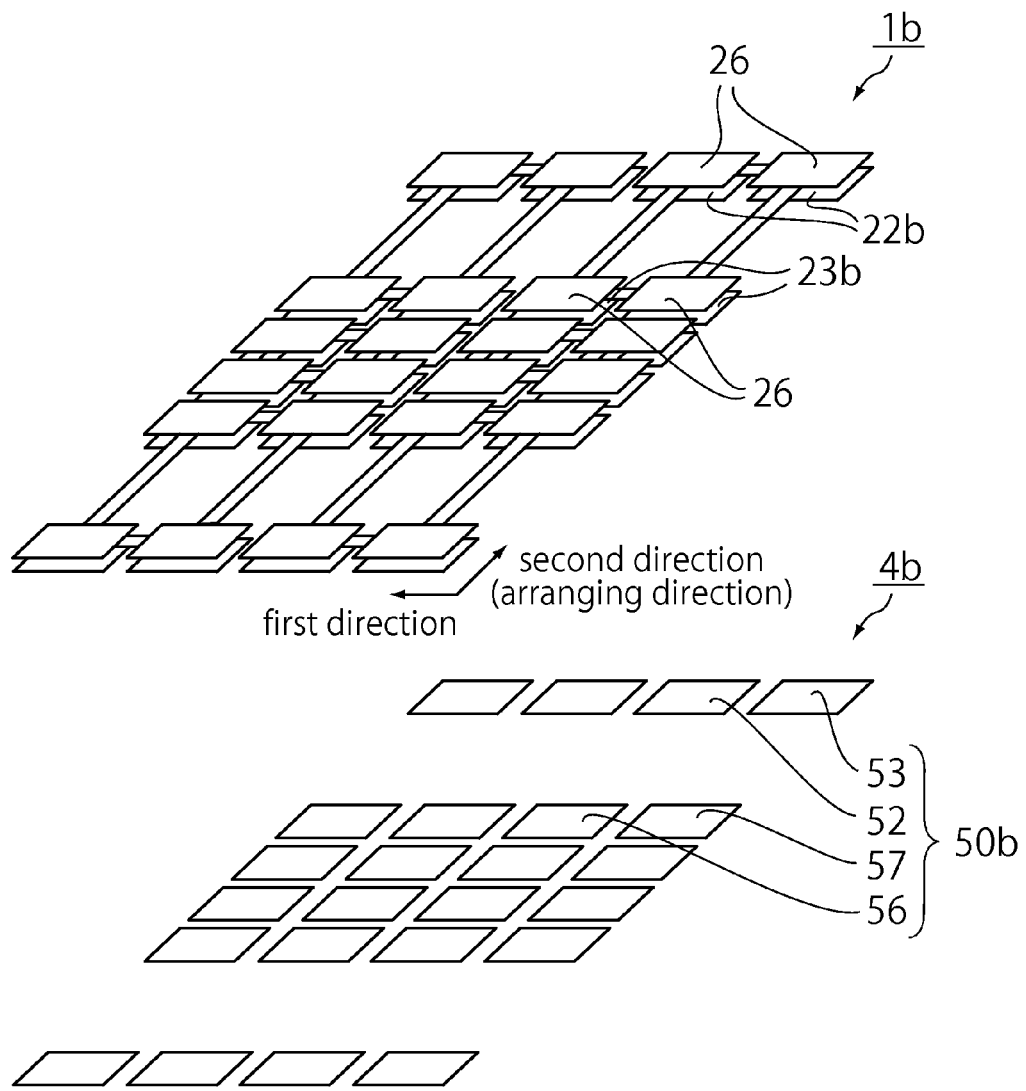
FIG. 7 is a schematic view showing a correspondence between electrodes of the pyroelectric sensor array of FIG. 5 and electrodes of a circuit board.

As shown in FIGS. 5 to 7, a pyroelectric infrared detection device according to a third embodiment of the present invention comprises a circuit board 4b and a pyroelectric sensor array 1b mounted on the circuit board 4b. The pyroelectric sensor array 1b is shaped in a plate-like shape similar to the pyroelectric sensor arrays 1 and 1a.

The pyroelectric board 10 is formed with four peripheral pyroelectric elements (pyroelectric elements) 20b and two central pyroelectric elements (pyroelectric elements) 30b. The pyroelectric elements 20b and 30b are arranged along a predetermined arrangement direction (a second direction). In detail, according to the present embodiment, the two pyroelectric elements 20b are arranged in the vicinity of the end portion 13 of the pyroelectric board 10 in the arrangement direction so as to be adjacent to each other in a first direction. The two pyroelectric elements 30b are arranged at the central portion of the pyroelectric board 10 in the arrangement direction so as to be adjacent to each other in the first direction.

Each of the pyroelectric elements 20b and 30b is composed of a light receiving electrode group 25b formed on the light receiving surface 11, a connection electrode group 21b formed on the connection surface 12, and a part of the pyroelectric board 10 sandwiched by the light receiving electrode group 25b and the connection electrode group 21b.

As shown in FIG. 5, a light receiving electrode group 25b according to the present embodiment includes four light receiving electrodes 26 located at respective four corners of an imaginary rectangle, and four connecting patterns 28 each made of a conductive material. The connecting pattern 28 connects the two adjacent light receiving electrodes 26 with each other. In other words, the four light receiving electrodes 26 of the light receiving electrode group 25 are electrically connected by the connecting patterns 28.

As shown in FIG. 6, the connection electrode group 21b according to the present embodiment includes two first connection electrodes (connection electrodes) 22b and two second connection electrodes (connection electrodes) 23b. The connection electrode 22b is a part which is electrically connected with a potential detection circuit (not shown) formed on the circuit board 4b under a connected state where the pyroelectric sensor array 1b and the circuit board 4b are connected. The connection electrode 23b is a part which is electrically connected with a ground portion (not shown) formed on the circuit board 4b under the connected state. Each of the connection electrodes 22b and 23b are arranged to be opposite to the light receiving electrode 26 via the pyroelectric board 10. The connection electrodes 22b and the connection electrode 23b face each other in the second direction which is in parallel to the connection surface 12. In detail, the connection electrode 22b and the connection electrode 23b have a facing side 221b and a facing side 231b, respectively. The facing side 221b and the facing side 231b extend in parallel to each other along the first direction.

The connection electrode 22b of the pyroelectric element 20b has a comb-like pattern 222b which extends from the facing side 221b along the second direction. Similarly, the connection electrode 23b of the pyroelectric element 20b has a comb-like pattern 232b which extends from the facing side 231b along the second direction. In other words, each of the connection electrodes 22b and 23b of the pyroelectric element 20b includes the comb-like pattern 222b or 232b which extends toward the opposite connection electrode 23b or 22b along the second direction. On the other hand, each of the connection electrodes 22b and 23b of the pyroelectric element 30b is not provided with the comb-like pattern 222b nor 232b.

Each of the comb-like patterns 222b and 232b according to the present embodiment consists of three conductive patterns (comb teeth). The comb-like pattern 222b and the comb-like pattern 232b are combined so that the comb tooth of one of the comb-like patterns 222b and 232b enters between the comb teeth of the remaining one of the comb-like patterns 222b and 232b. In other words, the comb-like pattern 222b of the connection electrode 22b (i.e. one of the two connection electrodes 22b and 23b) and the comb-like pattern 232b of the connection electrode 23b (i.e. the remaining one of the two connection electrodes 22b and 23b) face each other in the first direction which is perpendicular to the second direction and in parallel to the connection surface 12.

As can be seen from the aforementioned description, under the connected state, an electrostatic capacity is generated between the facing side 221b and the facing side 231b. In addition, a larger electrostatic capacity is generated between the comb-like pattern 222b and the comb-like pattern 232b. The comb-like pattern 222b and the comb-like pattern 232b are nearest parts in the connection electrode 22b and the connection electrode 23b. Accordingly, it is possible to further increase the electrostatic capacity by increasing a size of a region defined by the comb-like pattern 222b and the comb-like pattern 232b. More specifically, it is possible to further increase the electrostatic capacity, for example, by increasing the number of the teeth or by lengthening the length of the tooth. As described above, the comb-like patterns 222b and 232b are provided only to the pyroelectric element 20b. Accordingly, similar to the first embodiment, it is possible to reduce or cancel the variation of the total electrostatic capacity.

As can be seen from FIGS. 5 to 7, the circuit board 4b according to the present embodiment is formed with circuit electrode groups 50b corresponding to the respective pyroelectric elements 20b and 30b. The circuit electrode group 50b includes the two first circuit electrodes (circuit electrodes) 52 and 53, and the two second circuit electrodes (circuit electrodes) 56 and 57. The circuit electrodes 52 and 53 are electrically connected with two potential detection circuits (not shown), respectively. The circuit electrodes 52 and 53 are electrically connected to the two connection electrodes 22b under the connected state, respectively. The circuit electrodes 56 and 57 are electrically connected with a ground portion (not shown). The circuit electrodes 56 and 57 are electrically connected to the two connection electrodes 23b under the connected state, respectively. As can be seen from the aforementioned description, according to the present embodiment, a so-called quad pyroelectric sensor is formed from each of the pyroelectric elements 20b and 30b.

Figure 8:
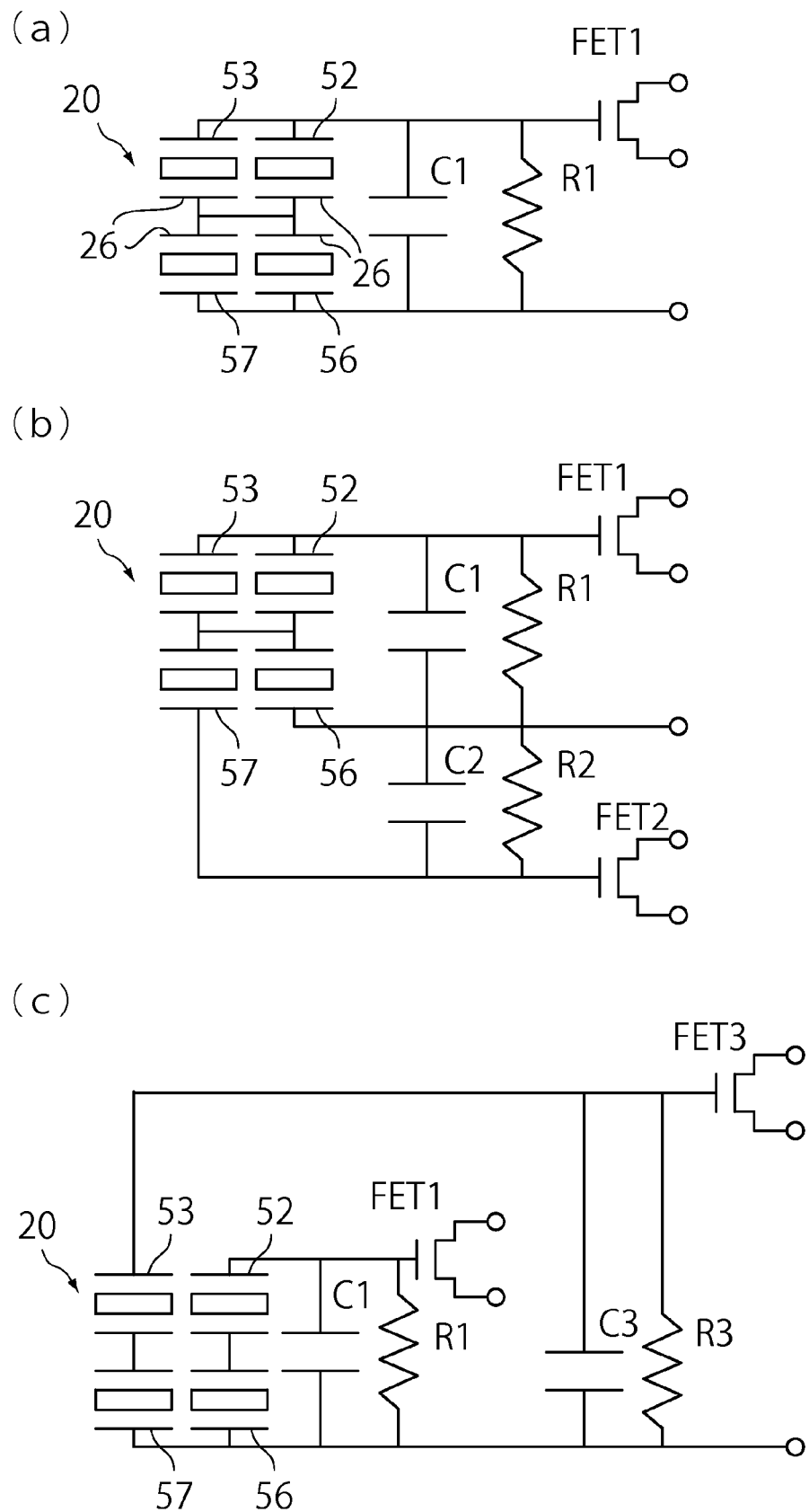
FIG. 8 is a collection of circuit diagrams each featuring a pyroelectric element arranged at a peripheral portion of a pyroelectric infrared detection device which is schematically shown in FIG. 7.

For example, as shown in FIG. 8 (a), the circuit electrodes 52 and 53 of the pyroelectric element 20b are connected to an end of a high-resistivity resistor R1 and Gate of an FET1 which is a Field Effect Transistor (FET). The circuit electrodes 56 and 57 are connected to the other end of the high-resistivity resistor R1 and a ground portion. In addition, a large electrostatic capacity C1 mainly corresponding to a space between the comb-like pattern 222b and the comb-like pattern 232b is generated between the circuit electrode 52 and the circuit electrode 56 of the pyroelectric element 20b. Similarly, the electrostatic capacity C1 is also generated between the circuit electrode 53 and the circuit electrode 57 of the pyroelectric element 20b. The pyroelectric element 20 in the circuit arranged as described above functions as two dual pyroelectric sensors which are connected at the light receiving electrode 26. When the circuit is thus arranged, it is possible to detect an infrared light applied to any one of the four light receiving electrodes 26 by the FET1.

A circuit shown in FIG. 8 (b) is formed by adding a high-resistivity resistor R2 and an FET2 to the circuit of FIG. 8 (a). The circuit electrode 57 is connected to an end of the high-resistivity resistor R2 and Gate of the FET2. The other end of the high-resistivity resistor R2 is connected to the circuit electrode 56. In addition, an electrostatic capacity C2 is generated between the circuit electrode 56 and the circuit electrode 57 (see the arrangement of FIG. 7). When the circuit is thus arranged, it is possible to widen a reception range where an infrared light is applied. More specifically, for example, even when an infrared light is simultaneously applied to both the light receiving electrode 26 corresponding to the circuit electrode 53 and the light receiving electrode 26 corresponding to the circuit electrode 57, it is possible to detect by the FET2.

Moreover, a circuit shown in FIG. 8 (*c*) is formable by slightly modifying a configuration of the light receiving electrode group 25*b* shown in FIG. 5 (in detail, by cutting off the connecting pattern 28 which connects the two light receiving electrodes 26 adjoining each other in the first direction). The circuit shown in FIG. 8 (*c*) is formed by adding a high-resistivity resistor R3 and an FET3 to the circuit of FIG. 8 (*a*). The circuit electrode 53 is connected to an end of the high-resistivity resistor R3 and Gate of the FET3. The other end of the high-resistivity resistor R3 is connected to the circuit electrode 56. In addition, an electrostatic capacity C3 is generated between the circuit electrode 53 and the circuit electrode 56. When the circuit is thus arranged, it is possible to widen a reception range where an infrared light is applied. More specifically, for example, even when an infrared light is simultaneously applied to both the light receiving electrode 26 corresponding to the circuit electrode 53 and the light receiving electrode 26 corresponding to the circuit electrode 56, it is possible to detect by the FET3.

It is possible to detect an electric potential of the pyroelectric sensor in each circuit of FIGS. 8 (*a*) to (*c*) by using an electronic component other than the FET. For example, it is possible to detect the electric potential by using a potential detection element which includes an operation amplifier and has high input impedance.

[Fourth Embodiment]

Figure 9:
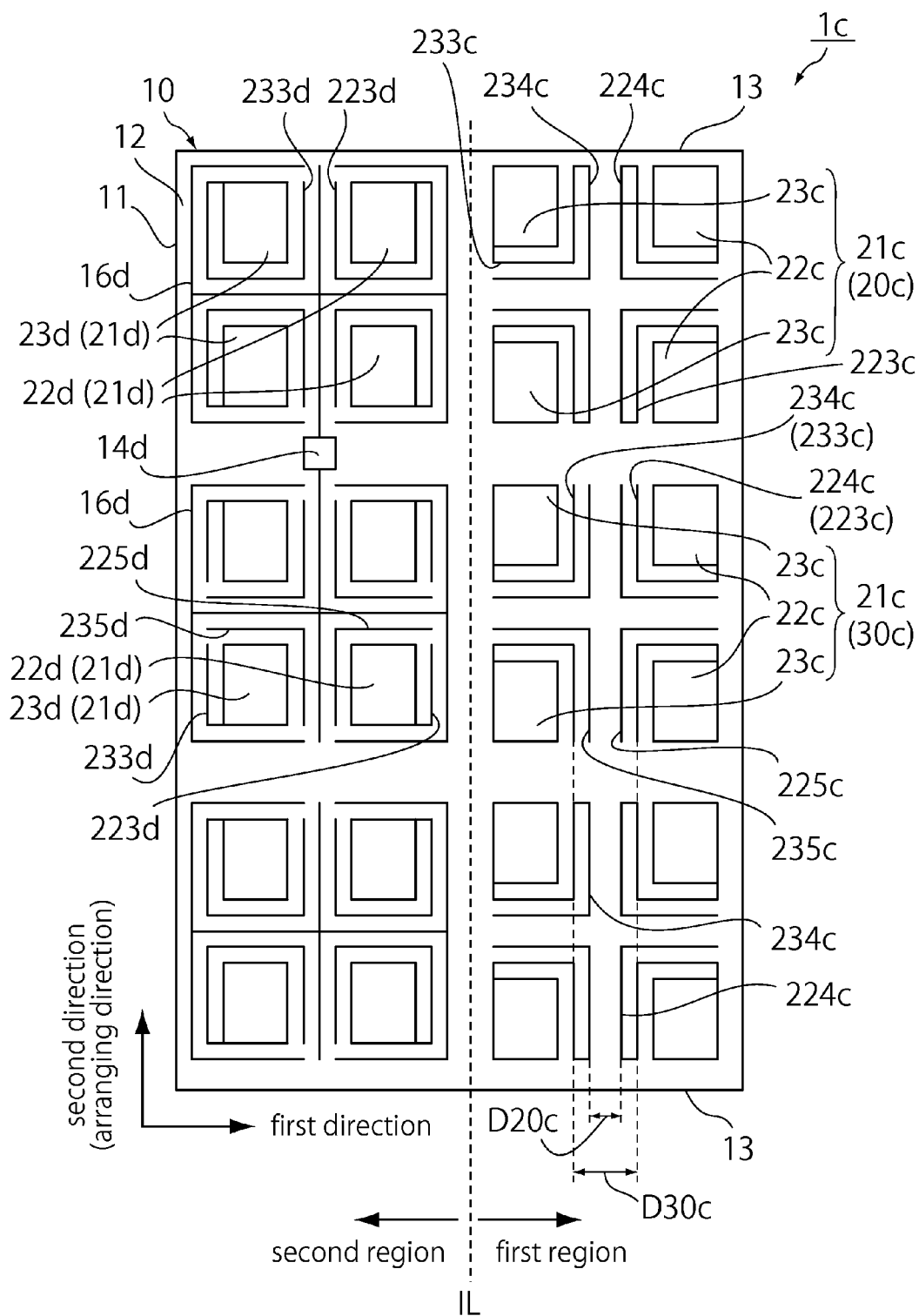
FIG. 9 is a plan view showing a connection surface of a pyroelectric sensor array according to a fourth embodiment of the present invention.

As can be seen from FIG. 9, a pyroelectric infrared detection device according to a fourth embodiment of the present invention is configured similar to the pyroelectric infrared detection device according to each of the already described embodiments. More specifically, the pyroelectric infrared detection device according to the fourth embodiment comprises a plate-like pyroelectric sensor array 1*c* and a circuit board (not shown) on which the pyroelectric sensor array 1*c* is mounted. The pyroelectric board 10 according to the fourth embodiment has a first region and a second region which have an imaginary line (IL) shown in FIG. 9 as a border line.

As shown in FIG. 9, the first region of the pyroelectric board 10 is formed with two peripheral pyroelectric elements (pyroelectric elements) 20*c* and one central pyroelectric element (pyroelectric element) 30*c*. The pyroelectric element 30*c* is arranged between the two pyroelectric elements 20*c* in a predetermined arrangement direction (a second direction). Similar to the already described embodiments, each of the pyroelectric elements 20*c* and 30*c* includes a light receiving electrode group (not shown) formed on the light receiving surface 11 and a connection electrode group 21*c* formed on the connection surface 12.

Similar to the third embodiment, the connection electrode group 21*c* has two sets each including a first connection electrode (connection electrode) 22*c* and a second connection electrode (connection electrode) 23*c*. Similar to the first and second embodiments, the connection electrode 22*c* and the connection electrode 23*c* face each other in a first direction parallel to the connection surface 12. The connection electrode 22*c* is a part which is electrically connected with a potential detection circuit (not shown) formed on the circuit board (not shown) under a connected state where the pyroelectric sensor array 1*c* and the circuit board are connected. The connection electrode 23*c* is a part which is electrically connected with a ground portion (not shown) formed on the circuit board under the connected state.

The connection electrodes 22*c* and 23*c* include extension patterns 223*c* and 233*c*, respectively. The extension pattern 223*c* (the extension pattern 233*c*) is extended from the connection electrode 22*c* (the connection electrode 23*c*). The extension pattern 223*c* (the extension pattern 233*c*) extends along an outer boundary of the connection electrode 22*c* (the connection electrode 23*c*) so that a facing portion 224*c* (a facing portion 234*c*) is formed. The facing portion 224*c* and the facing portion 234*c* extend in parallel to each other so as to be located near to each other in the first direction. In other words, the extension pattern 223*c* (the extension pattern 233*c*) extends from the connection electrode 22*c* (the connection electrode 23*c*) so as to encircle the connection electrode 22*c* (the connection electrode 23*c*). The extension pattern 223*c* and the extension pattern 233*c* partially face each other in the first direction. As can be seen from the aforementioned description, under the connected state, an electrostatic capacity is generated between the facing portion 224*c* of the extension pattern 223*c* and the facing portion 234*c* of the extension pattern 233*c*.

The extension pattern 223*c* (the extension pattern 233*c*) of the connection electrode 22*c* (the connection electrode 23*c*) of the pyroelectric element 20*c* (i.e. the connection electrode 22*c* or 23*c* formed in the vicinity of the end portion 13 of the pyroelectric board 10) extends along the outer boundary of the connection electrode 22*c* (the connection electrode 23*c*) while turning back. On the other hand, the extension pattern 223*c* (the extension pattern 233*c*) of the connection electrode 22*c* (the connection electrode 23*c*) of the pyroelectric element 30*c* (i.e. the connection electrode 22*c* or 23*c* formed at the central portion of the pyroelectric board 10) is formed by cutting off a middle part of a conductive pattern which extends along the outer boundary of the connection electrode 22*c* (the connection electrode 23*c*) while turning back. Accordingly, a fragment 225*c* (a fragment 235*c*) is formed in the vicinity of the extension pattern 223*c* (the extension pattern 233*c*) of the pyroelectric element 30*c*.

As can be seen from FIG. 9, an area of each of the extension patterns 223*c* and 233*c* of the pyroelectric element 20*c* is wider than an area of each of the extension patterns 223*c* and 233*c* of the pyroelectric element 30*c*. In detail, a length of each of the facing portions 224*c* and 234*c* of the pyroelectric element 20*c* is longer than a length of each of the facing portions 224*c* and 234*c* of the pyroelectric element 30*c*. In other words, a length of a facing part of each of the extension patterns 223*c* and 233*c* of the pyroelectric element 20*c* is longer than a length of a facing part of each of the extension patterns 223*c* and 233*c* of the pyroelectric element 30*c*. Moreover, a distance between the connection electrode 22*c* and the connection electrode 23*c* of the pyroelectric element 20*c* is smaller than a distance between the connection electrode 22*c* and the connection electrode 23*c* of the pyroelectric element 30*c*. In detail, a distance (D20*c*) between the facing portion 224*c* and the facing portion 234*c* of the pyroelectric element 20 is shorter than a distance (D30*c*) between the facing portion 224*c* and the facing portion 234*c* of the pyroelectric element 30. In other words, a distance in the first direction between the facing parts of the extension patterns 223*c* and 233*c* of the pyroelectric element 20 is shorter than a distance in the first direction between the facing parts of the extension patterns 223*c* and 233*c* of the pyroelectric element 30. Accordingly, an electrostatic capacity generated in the pyroelectric element 20*c* arranged in the vicinity of the peripheral portion of the pyroelectric board 10 may be larger than an electrostatic capacity generated in the pyroelectric element 30*c* arranged at the central portion of the pyroelectric board 10. As can be seen from the aforementioned description, according to the present embodiment, it is possible to obtain the effect similar to the first to third embodiments.

Moreover, according to the present embodiment, a mutual electromagnetic interference of the connection electrodes 22c and 23c of the pyroelectric element 30c is shielded by the fragments 225c and 235c which are insulated from each of the connection electrodes 22c and 23c. Accordingly, a mutual potential interference (potential interference) is suppressed.

Each of the fragments 225c and 235c according to the present embodiment is formable from a long conductive pattern similar to the extension pattern 223c (the extension pattern 233c) of the pyroelectric element 20c. The long conductive pattern is formed at the connection electrode 22c (the connection electrode 23c) of the pyroelectric element 30c. An end portion of the long conductive pattern is cut off, for example, by laser trimming so that the fragment 225c or 235c is formed. When forming as described above, it is possible to simultaneously form the extension pattern 223c (the extension pattern 233c) and the fragment 225c (the fragment 235c) of the pyroelectric element 30c.

Before the end portion of the long conductive pattern is cut off, a potential difference between a light receiving electrode (not shown) and each of the connection electrodes 22c and 23c is obtained, wherein the potential difference is generated when a temperature of the whole pyroelectric board 10 is changed evenly. Then, a distribution of the detection sensitivities of the pyroelectric elements 20c and 30c arranged on the pyroelectric board 10 (i.e. a variation of the detection sensitivity of the pyroelectric board 10 itself) is obtained based on the obtained potential difference. Then, a cut off position is obtained so that the variation of the detection sensitivity of the whole pyroelectric infrared detection device is reduced. More specifically, the cut off position is obtained by adjusting a distribution of material characteristics (i.e. the distribution of the detection sensitivity) of the pyroelectric board 10 itself while considering the electrostatic capacity of the circuit board (not shown).

The fragment 225c and 235c may be formed by a method other than partially cutting off the conductive pattern. For example, each of the extension pattern 223c, the extension pattern 233c, the fragment 225c and the fragment 235c may be formed as a separated pattern. Thus, the fragments 225c and 235c may be formed by a simpler process. However, the detection sensitivities may be distributed more uniformly when the fragments 225c and 235c are formed by partially cutting off the conductive patterns.

As can be seen from FIG. 9, two peripheral pyroelectric elements (pyroelectric elements) and one central pyroelectric element (pyroelectric element) which are formed similar to the first region are arranged in the second region of the pyroelectric board 10. The second region of the connection surface 12 is formed with three connection electrode groups 21d corresponding to the aforementioned three pyroelectric elements.

As shown in FIG. 9, the connection electrode group 21d is formed similar to the connection electrode group 21c. More specifically, the connection electrode group 21d includes two first connection electrodes (connection electrodes) 22d and two second connection electrodes (connection electrodes) 23d. The connection electrodes 22d face the connection electrodes 23d in the first direction. The connection electrodes 22d and 23d include extension patterns 223d and 233d, respectively. The extension patterns 223d and 233d extend so as to encircle the connection electrodes 22d and 23d, respectively. In addition, fragments 225d and 235d are formed in the vicinity of the connection electrodes 22d and 23d which are formed at the central portion of the pyroelectric board 10 in the arrangement direction (the second direction). The fragments 225d and 235d are separated from the extension patterns 223d and 233d, respectively.

As can be seen from FIG. 9, an area of each of the extension patterns 223d and 233d formed in the vicinity of the end portion 13 of the pyroelectric board 10 is wider than an area of each of the extension patterns 223d and 233d formed at the central portion of the pyroelectric board 10. In detail, a length of a facing part of the extension patterns 223d and 233d formed in the vicinity of the end portion 13 of the pyroelectric board 10 is longer than a length of a facing part of the extension patterns 223d and 233d of the pyroelectric element 30c formed at the central portion of the pyroelectric board 10. Moreover, a distance between the connection electrode 22d and the connection electrode 23d formed in the vicinity of the end portion 13 of the pyroelectric board 10 is smaller than a distance between the connection electrode 22d and the connection electrode 23d formed at the central portion of the pyroelectric board 10. As can be seen from the aforementioned description, it is possible to obtain the effect, which is similar to the effect by the formation of the first region, by the formation of the second region.

As shown in FIG. 9, a shield pattern (electric shielding) 16d is provided between the connection electrode 22d and the connection electrode 23d. The electric shielding 16d is formed so as to encircle each of the connection electrode 22d and the connection electrode 23d. In detail, the electric shielding 16d has first to third parts, wherein each of the first parts encircles the outside of the extension patterns 223d and 233d (i.e. the outside of the connection electrode group 21d), each of the second parts extends between the extension pattern 223d and the extension pattern 233d, and each of the third parts extends between the two extension patterns 223d (the extension patterns 233d). When the aforementioned electric shielding 16d is formed, similar to the case where the fragments 225c and 235c are formed, it is possible to suppress the potential interferences, wherein one of the potential interferences is caused between the connection electrode 22d and the connection electrode 23d, and the other one of the potential interferences is caused between the two connection electrodes 22d (the connection electrodes 23d).

The connection surface 12 is formed with a ground electrode 14d which is connected, for example, to the ground portion (not shown) of the circuit board. When the electric shielding 16d and the ground electrode 14d is connected, the electric shielding 16d is grounded so that it is possible to prevent an outer electric field from causes noises in the connection electrodes 22d and 23d.

According to the present embodiment, the first region and the second region of the connection surface 12 are formed with conductive patterns which are different from each other. However, the first region and the second region may be formed same as each other.

[Fifth Embodiment]

Figure 10:
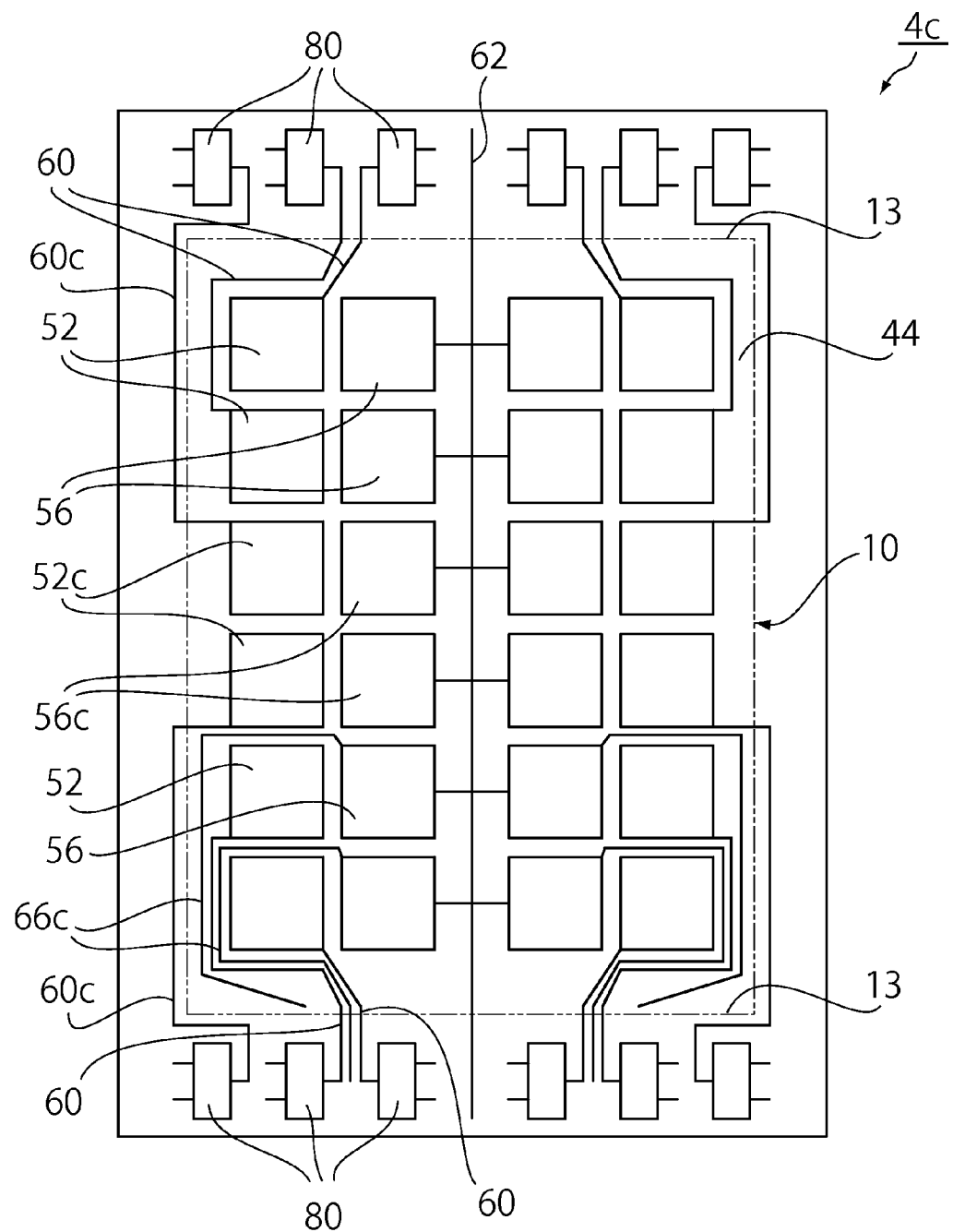
FIG. 10 is a top view showing a circuit board according to a fifth embodiment of the present invention, wherein an outline of a pyroelectric sensor array mounted on the circuit board is illustrated by two-dot chain line.

As can be seen from FIG. 10, a pyroelectric infrared detection device according to a fifth embodiment of the present invention comprises a pyroelectric sensor array (not shown) including the pyroelectric board 10 and a circuit board 4c on which the pyroelectric sensor array is mounted.

As shown in FIG. 10, the circuit board 4c according to the present embodiment comprises the mount portion 44 on which the pyroelectric board 10 is mounted, the twelve potential detection circuits 80, a ground portion (not shown), the eight first circuit electrodes (circuit electrodes) 52, four first circuit electrodes (circuit electrodes) 52c, the eight second circuit electrode (circuit electrode) 56, four second circuit electrodes (circuit electrodes) 56c, the eight conductive patterns 60, four conductive patterns 60c, and the one ground conductive pattern 62. The circuit board 4c according to the present embodiment is formed mirror symmetrically relative to the ground conductive pattern 62.

As can be seen from FIG. 10, the circuit electrodes 52, 52c, 56 and 56c are formed at positions which correspond to the respective connection electrodes (not shown) formed on the connection surface of the pyroelectric board 10. The circuit electrodes 52, 52c, 56 and 56c are electrically connected to the corresponding connection electrodes under a connected state of the pyroelectric sensor array with the circuit board 4c. According to the present embodiment, eight combination electrodes each composed of the circuit electrode 52 and the circuit electrode 56 are formed. These combination electrodes correspond to the pyroelectric elements (not shown) formed in the vicinity of the end portion 13 of the pyroelectric board 10. In addition, four combination electrodes each composed of the circuit electrode 52c and the circuit electrode 56c are formed. These combination electrodes correspond to the pyroelectric elements (not shown) formed at the central portion of the pyroelectric board 10.

The circuit electrodes 52 and 52c are electrically connected with the corresponding potential detection circuits 80 by the conductive patterns 60 and 60c, respectively. In detail, the conductive pattern 60c electrically connects the connection electrode (not shown) of the central pyroelectric element (not shown) of the pyroelectric board 10 and the potential detection circuit 80 with each other. The conductive pattern 60 electrically connects the connection electrode (not shown) of the peripheral pyroelectric element (not shown) of the pyroelectric board 10 and the potential detection circuit 80 with each other. The circuit electrodes 56 and 56c are electrically connected with the ground portion (not shown) by the ground conductive pattern 62.

As shown in FIG. 10, a distance from the one conductive pattern 60c to each of the other conductive patterns 60c, the conductive patterns 60 and the ground conductive pattern 62 is longer than a distance from the one conductive pattern 60 to each of the other conductive patterns 60, the conductive patterns 60c and the ground conductive pattern 62. In detail, according to the present embodiment, the three potential detection circuits 80 are arranged at each of four corners of the rectangular circuit board. The one conductive pattern 60c and the two conductive patterns 60 extend toward the respective three potential detection circuits 80 so as to be in parallel to one another. According to the present embodiment, the aforementioned conductive pattern 60c extends in the vicinity of the peripheral portion of the circuit board 4c and is designed to have a long distance from the adjacent conductive pattern 60. More specifically, a distance between the two conductive patterns 60 adjoining each other is reduced so that a distance between the conductive pattern 60c and the conductive pattern 60 is widened.

When configured as described above, it is possible to reduce an electrostatic capacity which is generated in the circuit electrode 52c under the connected state. As already described, the electrostatic capacity of the pyroelectric sensor is caused not only by the connection electrodes of the pyroelectric board 10 but also by the long extending conductive patterns 60 and 60c of the circuit board 4c. It is possible to reduce the electrostatic capacity by keeping the conductive pattern 60c, which is electrically connected to the connection electrode (not shown) at the central portion of the pyroelectric board 10, to be away from the other conductive members on the circuit board 4c.

As shown in FIG. 10, each of the four circuit electrodes 56 of the eight circuit electrodes 56 connected to the ground conductive pattern 62 has a circuit shield pattern 66c. The circuit shield pattern 66c extends from the circuit electrode 56. One of the circuit shield patterns 66c is located between the conductive pattern 60c and the conductive pattern 60. The other one of the circuit shield patterns 66c is located between the two conductive patterns 60. The aforementioned circuit shield patterns 66c are provided so that it is possible to prevent the mutual potential interference of the conductive patterns 60 and 60c.

[Sixth Embodiment]

Figure 11:
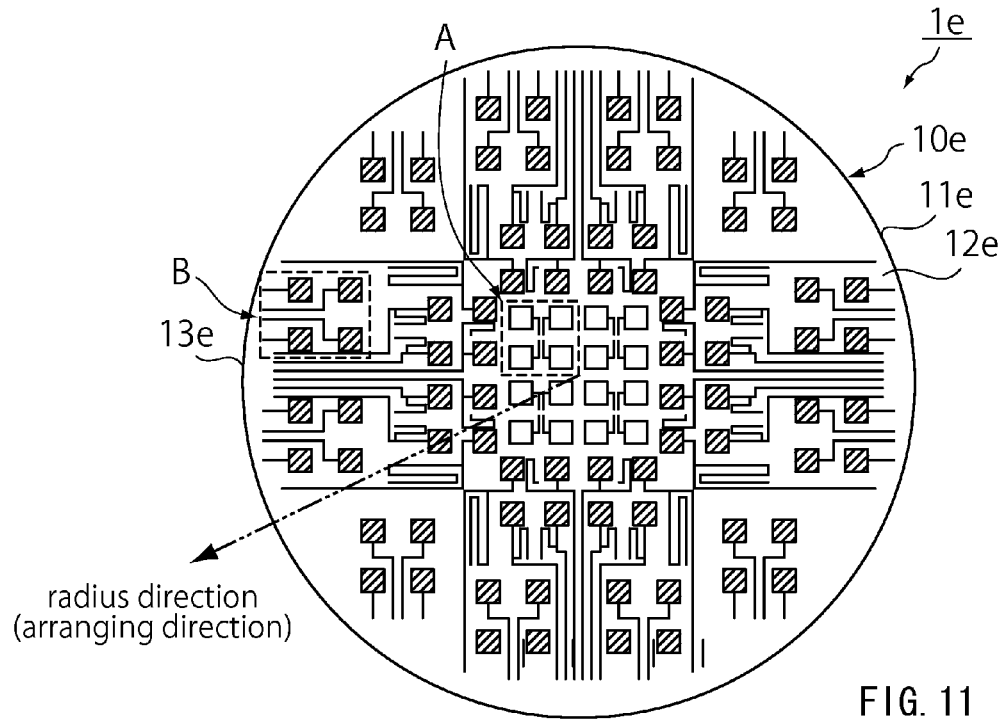
FIG. 11 is a plan view showing a connection surface of a pyroelectric sensor array according to a sixth embodiment of the present invention.

As can be seen from FIG. 11, a pyroelectric infrared detection device according to a sixth embodiment of the present invention comprises a pyroelectric sensor array 1e shaped in a dome-like shape and a circuit board (not shown) on which the pyroelectric sensor array 1e is mounted.

As shown in FIG. 11, the pyroelectric sensor array 1e comprises a pyroelectric board 10e made of a pyroelectrics, a plurality of peripheral pyroelectric elements (pyroelectric elements) 20e formed on the pyroelectric board 10e, and a plurality of central pyroelectric elements (pyroelectric elements) 30e formed on the pyroelectric board 10e.

The pyroelectric board 10e according to the present embodiment is shaped in a dome-like shape which has a central portion bulging upward. In detail, the pyroelectric board 10 has a light receiving surface 11e configured to receive an infrared light and a connection surface 12e configure to be placed on the circuit board (not shown). The light receiving surface 11e has, for example, a convex shape. The connection surface 12e is a surface opposite to the light receiving surface 11e. The pyroelectric board 10e has an end portion (rim portion) 13e at the rim thereof in a radius direction.

The pyroelectric elements 20e are arranged in the vicinity of the end portion 13e in the radius direction while the pyroelectric elements 30e are arranged in the vicinity of the center in the radius direction. In other words, according to the present embodiment, an arrangement direction of the pyroelectric elements 20e and 30e is the radius direction of the pyroelectric board 10e.

Figure 12:
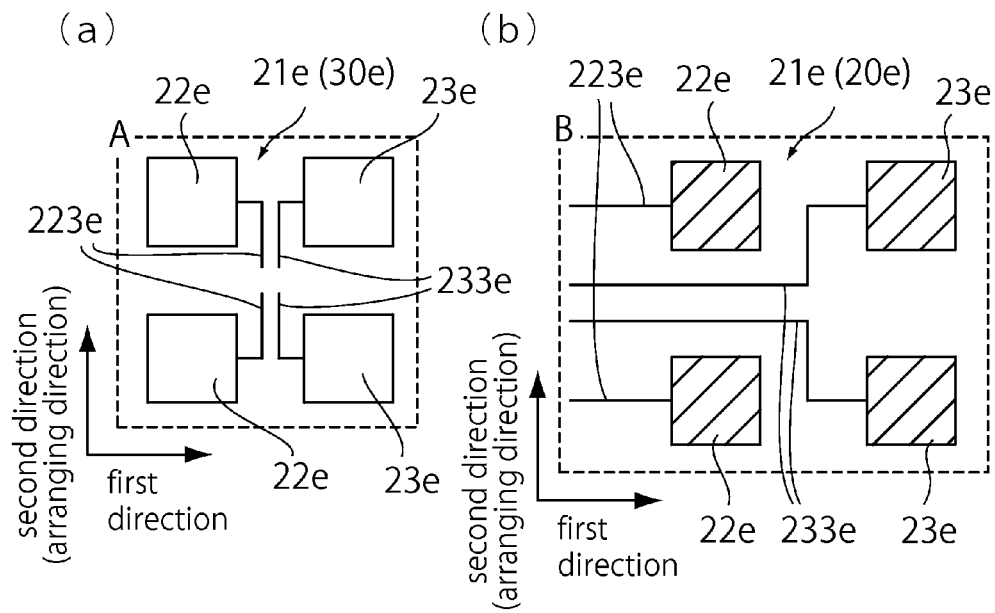
FIG. 12 is a collection of enlarged, plan views each showing a part of the connection surface of FIG. 11.

As can be seen from FIGS. 11 and 12, each of the pyroelectric elements 20e and 30e according to the present embodiment includes a connection electrode group 21e. The connection electrode group 21e includes two sets each including a first connection electrode (connection electrode) 22e and a second connection electrode (connection electrode) 23e which face each other in a first direction substantially parallel to the connection surface 12. Similar to the aforementioned embodiments, the connection electrode 22e is a part which is electrically connected with a potential detection circuit (not shown) formed on the circuit board (not shown) under a connected state where the pyroelectric sensor array 1e and the circuit board are connected. The connection electrode 23e is a part which is electrically connected with a ground portion (not shown) formed on the circuit board under the connected state.

The connection electrodes 22e and 23e are formed with extension patterns 223e and 233e, respectively. A length of each of the extension patterns 223e and 233e formed in the connection electrode group 21e of the peripheral portion of the pyroelectric board 10e is longer than a length of each of the extension patterns 223e and 233e formed in the connection electrode group 21e of the central portion of the pyroelectric board 10e. Accordingly, it is possible to make an electrostatic capacity of the connection electrode group 21e arranged at the peripheral portion of the pyroelectric board 10e larger than an electrostatic capacity of the connection electrode group 21e arranged at the central portion of the pyroelectric board 10e.

As can be seen from the aforementioned description, according to the present embodiment, similar to the aforementioned embodiments, it is possible to reduce or cancel the variation of the electrostatic capacity without damaging the heat insulation between the pyroelectric sensor array 1e and the circuit board (not shown). Accordingly, it is possible to reduce the variation of the infrared detection sensitivities (the detection sensitivities) and the variation of the time response characteristics of the pyroelectric elements 20e and 30e.

The present application is based on a Japanese patent application of JP2010-238221 filed before the Japan Patent Office on Oct. 25, 2010, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 1, 1a, 1b, 1c, 1e pyroelectric sensor array
10, 10e pyroelectric board
11, 11e light receiving surface
12, 12e connection surface
13 end portion
13e end portion (rim portion)
14d ground electrode
16d shield pattern (electric shielding)
20, 20a, 20b, 20c, 20e peripheral pyroelectric element (pyroelectric element)
21, 21a, 21b, 21c, 21d, 21e connection electrode group
22, 22a, 22b, 22c, 22d, 22e first connection electrode (connection electrode)
23, 23a, 23b, 23c, 23d, 23e second connection electrode (connection electrode)
221, 221a, 221b facing side (of the first connection electrode)
231, 231a, 231b facing side (of the second connection electrode)
222b, 232b comb-like pattern
223c, 223d, 223e extension pattern (of the first connection electrode)
233c, 233d, 233e extension pattern (of the second connection electrode)
224c, 234c facing portion
225c, 225d, 235c, 235d fragment
25, 25b light receiving electrode group
26 light receiving electrode
28 connecting pattern
30, 30a, 30b, 30c, 30e central pyroelectric element (pyroelectric element)
4, 4b, 4c circuit board
42 board connection surface
44 mount portion
50 circuit electrode group (combination electrode)
50b circuit electrode group
52, 52c, 53 first circuit electrode (circuit electrode)
56, 56c, 57 second circuit electrode (circuit electrode)
60, 60c conductive pattern
62 ground conductive pattern
66c circuit shield pattern
80 potential detection circuit

What is claimed is:

1. A pyroelectric sensor array attachable on a circuit board, the pyroelectric sensor array comprising:
a pyroelectric board having a connection surface configured to be placed on the circuit board; and
a plurality of pyroelectric elements formed on the pyroelectric board, the pyroelectric elements containing a peripheral pyroelectric element arranged at a peripheral portion of the pyroelectric board in a predetermined arranging direction and a central pyroelectric element arranged at a central portion of the pyroelectric board, each of the pyroelectric elements having two adjacent connection electrodes formed on the connection surface, an electrostatic capacity between the two connection electrodes of the peripheral pyroelectric element being larger than an electrostatic capacity between the two connection electrodes of the central pyroelectric element.

2. The pyroelectric sensor array according to claim 1, wherein a length of a part which generates the electrostatic capacity between the two connection electrodes of the peripheral pyroelectric element is longer than a length of a part which generates the electrostatic capacity between the two connection electrodes of the central pyroelectric element.

3. The pyroelectric sensor array according to claim 1, wherein a distance between parts which generate the electrostatic capacity between the two connection electrodes of the peripheral pyroelectric element is shorter than a distance between parts which generate the electrostatic capacity between the two connection electrodes of the central pyroelectric element.

4. The pyroelectric sensor array according to claim 1, wherein:
the two connection electrodes face each other in a first direction in parallel to the connection surface; and
in a second direction which is perpendicular to the first direction and in parallel to the connection surface, a length of each of the two connection electrodes of the peripheral pyroelectric element is longer than a length of each of the two connection electrodes of the central pyroelectric element.

5. The pyroelectric sensor array according to claim 4, wherein, a distance in the first direction between the two connection electrodes of the peripheral pyroelectric element is shorter than a distance in the first direction between the two connection electrodes of the central pyroelectric element.

6. The pyroelectric sensor array according to claim 1, wherein:
the two connection electrodes face each other in a second direction in parallel to the connection surface; and
each of the two connection. electrodes of the peripheral pyroelectric element includes a comb-like pattern extending toward the opposite connection electrode along the second direction, the comb-like pattern of one of the two connection electrodes and the comb-like pattern of a remaining one of the two connection electrodes face each other in a first direction which is perpendicular to the second direction and in parallel to the connection surface.

7. The pyroelectric sensor array according to claim 1, wherein;
the two connection electrodes face each other in a first direction in parallel to the connection surface;
each of the two connection electrodes includes an extension pattern which extends from the connection electrode so as to encircle the connection electrode, the extension patterns partially facing each other in the first direction; and a length of a facing part of the extension pattern of the peripheral pyroelectric element is longer than a length of a facing part of the extension pattern of the central pyroelectric element.

8. The pyroelectric sensor array according to claim 7, wherein, a distance in the first direction between the facing parts of the extension patterns of the peripheral pyroelectric element is shorter than a distance in the first direction between the facing parts of the extension patterns of the central pyroelectric element.

9. The pyroelectric sensor array according to claim 1, wherein an electric shielding is provided between the two connection electrodes.

10. The pyroelectric sensor array according to claim 9, wherein the electric shielding is formed so as to encircle each of the connection electrodes.

11. The pyroelectric sensor array according to one of c claim 1, wherein:
   the pyroelectric board is shaped in a plate-like shape which extends in two directions perpendicular to each other;
   the arranging direction is one of the two directions; and
   the peripheral pyroelectric element is arranged in the vicinity of an end portion in the arranging direction while the central pyroelectric element is arranged in the vicinity of a middle portion in the arranging direction.

12. The pyroelectric sensor array according to claim 1, wherein:
   the pyroelectric board is shaped in a dome-like shape;
   the arranging direction is a radius direction of the pyroelectric board; and
   the peripheral pyroelectric element is arranged in the vicinity of a rim portion in the arranging direction while the central pyroelectric element is arranged in the vicinity of a central portion in the arranging direction.

13. A pyroelectric infrared detection device comprising the pyroelectric sensor array according to claim 1 and a circuit board attached with the pyroelectric sensor array, wherein:
   the circuit board includes a mount portion on which the connection surface of the pyroelectric sensor array is placed, a plurality of potential detection circuits provided on outside of the mount portion, a ground portion, a plurality of conductive patterns and a plurality of ground conductive patterns; and
   the conductive pattern electrically connects one of the two connection. electrodes and the potential detection circuit with each other while the ground conductive pattern electrically connects a remaining one of the two connection electrodes and the ground portion with each other.

14. The pyroelectric infrared detection device according to claim 13, wherein a length of a conductive pattern which electrically connects the connection electrode of the peripheral pyroelectric element and the potential detection circuit with each other is shorter than a length of a conductive pattern which electrically connects the connection electrode of the central pyroelectric element and the potential detection circuit with each other.

15. The pyroelectric infrared detection device according to claim 13, wherein a distance between a conductive pattern, which electrically connects the connection electrode of the central pyroelectric element and the potential detection circuit with each other, and each of the other conductive pattern and the ground conductive pattern is longer than a distance between a conductive pattern, which electrically connects the connection electrode of the peripheral pyroelectric element and the potential detection circuit with each other, and each of the other conductive pattern and the ground conductive pattern.

* * * * *